(12) United States Patent
Lai et al.

(10) Patent No.: US 9,544,607 B2
(45) Date of Patent: Jan. 10, 2017

(54) METHOD OF PALETTE INDEX SIGNALING FOR IMAGE AND VIDEO CODING

(71) Applicant: MediaTek Inc., Hsin-Chu (TW)

(72) Inventors: Wang Lin Lai, San Jose, CA (US); Shan Liu, San Jose, CA (US); Tzu-Der Chuang, Zhubei (TW); Jungsun Kim, San Jose, CA (US)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 0 days.

(21) Appl. No.: 14/805,605

(22) Filed: Jul. 22, 2015

(65) Prior Publication Data

US 2016/0057434 A1   Feb. 25, 2016

Related U.S. Application Data

(60) Provisional application No. 62/106,357, filed on Jan. 22, 2015, provisional application No. 62/041,180, filed on Aug. 25, 2014.

(51) Int. Cl.
*G06K 9/36* (2006.01)
*H04N 19/176* (2014.01)
(Continued)

(52) U.S. Cl.
CPC .......... *H04N 19/176* (2014.11); *H04N 1/644* (2013.01); *H04N 19/105* (2014.11); *H04N 19/11* (2014.11); *H04N 19/182* (2014.11); *H04N 19/186* (2014.11); *H04N 19/44* (2014.11); *H04N 19/463* (2014.11); *H04N 19/593* (2014.11);
(Continued)

(58) Field of Classification Search
CPC .... H04N 19/44; H04N 19/172; H04N 19/176; H04N 19/186; H04N 1/646; H04N 2201/0089; G06T 9/00
See application file for complete search history.

(56) References Cited

U.S. PATENT DOCUMENTS

| 2014/0301474 A1* | 10/2014 | Guo ............... H04N 19/50 375/240.24 |
| 2015/0146976 A1* | 5/2015 | Ma ............... H04N 1/646 382/166 |

(Continued)

OTHER PUBLICATIONS

Bugdayci, D., et al.; "Improvements on palette coding;" Joint Collaborative Team on Video Coding (JCT-VC) of ITU-T SG16 WP 3 and ISO/IEC JTC 1/SC 29/WG 11; Mar.-Apr. 2014; pp. 1-8.

(Continued)

*Primary Examiner* — Amir Alavi
(74) *Attorney, Agent, or Firm* — McClure, Qualey & Rodack, LLP (57) ABSTRACT

Method and apparatus for coding a block of video data using palette coding in a video coding are disclosed. According to one embodiment, whether there is only one single palette index in the current block is determined first. If there is only one single palette index in the current block, signaling a current palette index map for the current block is omitted at an encoder side or parsing any syntax for decoding the current palette index map for the current block is omitted at a decoder side. The decision regarding whether there is only one single palette index in the current block is based on one or more syntax elements not corresponding to palette index coding.

17 Claims, 3 Drawing Sheets

(51) Int. Cl.
*H04N 19/44* (2014.01)
*H04N 1/64* (2006.01)
*H04N 19/105* (2014.01)
*H04N 19/70* (2014.01)
*H04N 19/593* (2014.01)
*H04N 19/11* (2014.01)
*H04N 19/463* (2014.01)
*H04N 19/186* (2014.01)
*H04N 19/182* (2014.01)
*H04N 19/93* (2014.01)
*H04N 19/94* (2014.01)

(52) U.S. Cl.
CPC ............ *H04N 19/70* (2014.11); *H04N 19/93* (2014.11); *H04N 19/94* (2014.11)

(56) References Cited

U.S. PATENT DOCUMENTS

| | | | |
|---|---|---|---|
| 2015/0341655 A1* | 11/2015 | Joshi | H04N 19/70 375/240.16 |
| 2015/0341674 A1* | 11/2015 | Seregin | H04N 19/105 375/240.12 |
| 2016/0057434 A1* | 2/2016 | Lai | H04N 19/176 382/233 |
| 2016/0100171 A1* | 4/2016 | Karczewicz | H04N 19/13 375/240.02 |
| 2016/0100174 A1* | 4/2016 | Yu | H04N 19/186 375/240.24 |
| 2016/0100177 A1* | 4/2016 | Pu | H04N 19/186 375/240.24 |
| 2016/0100178 A1* | 4/2016 | Lin | H04B 19/186 382/166 |

OTHER PUBLICATIONS

Lai, P.L., et al.; "Description of screen content coding technology proposal by MediaTek;" Joint Collaborative Team on Video Coding (JCT-VC) of ITU-T SG16 WP 3 and ISO/IEC JTC 1/SC 29/WG 11; Mar.-Apr. 2014; pp. 1-31.

Xiu, X., et al.; "Description of screen content coding technology proposal by InterDigital;" Joint Collaborative Team on Video Coding (JCT-VC) of ITU-T SG16 WP 3 and ISO/IEC JTC 1/SC 29/WG 11; Mar.-Apr. 2014; pp. 1-30.

Zhu, W., et al.; "Palette-based compound image compression in HEVC by Exploiting Non-Local Spatial Correlation;" IEEE International Conference on Acoustic, Speech and Signal Processing (ICASSP); 2014; pp. 7348-7352.

Guo, L., et al.; "Results of Test 3.1 on Palette Mode for Screen Content Coding;" Joint Collaborative Team on Video Coding (JCT-VC) of ITU-T SG16 WP 3 and ISO/IEC JTC 1/SC 29/WG 11; Jul.-Aug. 2013; pp. 1-7.

Guo, L., et al.; "Evaluation of Palette Mode Coding on HM-12.0+Rext-4.1;" Joint Collaborative Team on Video Coding (JCT-VC) of ITU-T SG16 WP 3 and ISO/IEC JTC 1/SC 29/WG 11; Oct.-Nov. 2013; pp. 1-7.

Joshi, R., et al.; "Screen Content Coding Test Model 2 (SCM2);" Joint Collaborative Team on Video Coding (JCT-VC) of ITU-T SG16 WP 3 and ISO/IEC JTC 1/SC 29/WG 11; Mar.-Apr. 2014; pp. 1-10.

* cited by examiner

| 0 | 0 | 0 | 1 | 4 | 4 | 0 | 0 | 0 | 0 | 0 | 0 |
|---|---|---|---|---|---|---|---|---|---|---|---|
| 0 | 0 | 0 | 1 | 4 | 4 | 0 | 0 | 2 | 4 | 4 | 4 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

*Fig. 1A*

| 0 | 0 | 0 | 1 | 4 | 4 | 0 | 0 | 0 | 0 | 0 | 0 |
|---|---|---|---|---|---|---|---|---|---|---|---|
| 0 | 0 | 0 | 1 | 4 | 4 | 0 | 0 | 2 | 4 | 4 | 4 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 1 | 4 | 4 | 0 | 0 | 2 | 4 | 4 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 |

METHOD OF PALETTE INDEX SIGNALING FOR IMAGE AND VIDEO CODING

CROSS REFERENCE TO RELATED APPLICATIONS

The present invention claims priority to U.S. Provisional Patent Application, Ser. No. 62/041,180, filed on Aug. 25, 2014 and U.S. Provisional Patent Application, Ser. No. 62/106,357, filed on Jan. 22, 2015. The U.S. Provisional Patent Applications are hereby incorporated by reference in their entireties.

FIELD OF THE INVENTION

The present invention relates to palette index coding for image and video data. In particular, the present invention relates to various techniques to improve coding efficiency when there is only one single palette index in a block.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition. Several coding tools for screen content coding have been developed. These tools related to the present invention are briefly reviewed as follow.

Palette Coding

During the development of HEVC screen content coding (SCC), several proposals have been disclosed to address palette-based coding. For example, a palette prediction and sharing technique is disclosed in JCTVC-N0247 (Guo et al., "RCE3: *Results of Test* 3.1 *on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247) and JCTVC-O0218 (Guo et al., "*Evaluation of Palette Mode Coding on HM*-12.0+*RExt*-4.1", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0218). In JCTVC-N0247 and JCTVC-O0218, the palette of each color component is constructed and transmitted. The palette can be predicted (or shared) from its left neighboring CU to reduce the bitrate. All pixels within the given block are then coded using their palette indices. An example of encoding process according to JCTVC-N0247 is shown as follows.

1. Transmission of the palette: the color index table (also called palette table) size is first transmitted followed by the palette elements (i.e., color values).
2. Transmission of pixel values: the pixels in the CU are encoded in a raster scan order. For each group of one or more pixels, a flag for a run-based mode is first transmitted to indicate whether the "copy-index mode" or "copy-above mode" is being used.

2.1 "Copy-index mode": In this run-based mode, a respective palette index is first signaled followed by a respective run value "palette_run" (e.g., M) representing the run value. The "copy-index mode" is also referred as "index" mode in some literature. The term "palette_run" may also be referred as "pixel_run" or simply "run" in this disclosure. The run value indicates that a total of M consecutive samples are all coded using run mode. No further information needs to be transmitted for the current position and the following M positions since they have the same palette index as that signaled in the bitstream. The palette index (e.g., i) may also be shared by all three color components, which means that the reconstructed pixel values are (Y, U, V)=(palette$_Y$[i], palette$_U$[i], palette$_V$[i]) for the case of YUV color space.

2.2 "Copy-above mode": In the copy-above mode, a respective value "palette_run" (e.g. N) is transmitted to indicate that for the current pixel and the following N pixels, the palette index is the same as the corresponding palette index in the row above.

3. Transmission of residue: the palette indices transmitted in Stage 2 are converted back to pixel values and used as the prediction. Residue information is transmitted using HEVC residual coding and is added to the prediction for the reconstruction.

Figure 1A:
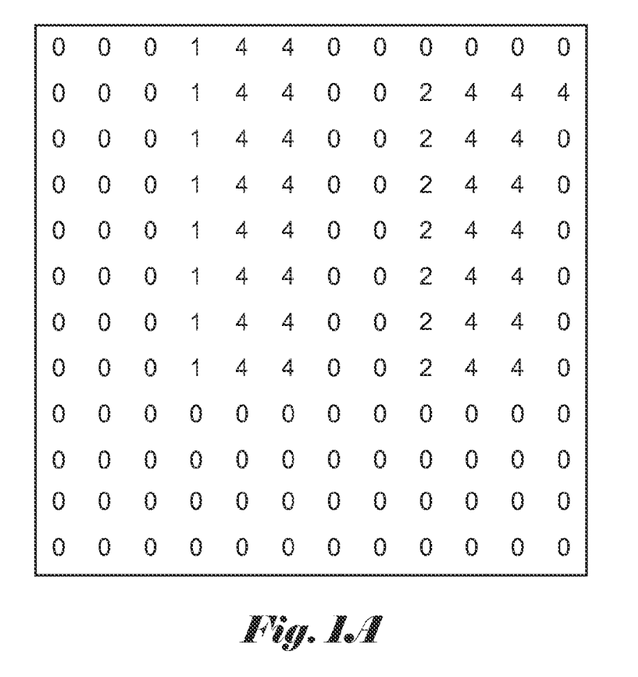
FIGS. 1A-C illustrate an exemplary of palette index map and palette index map coding according to screen content coding test model 2.0 (SCM-2.0).
Figure 1B:
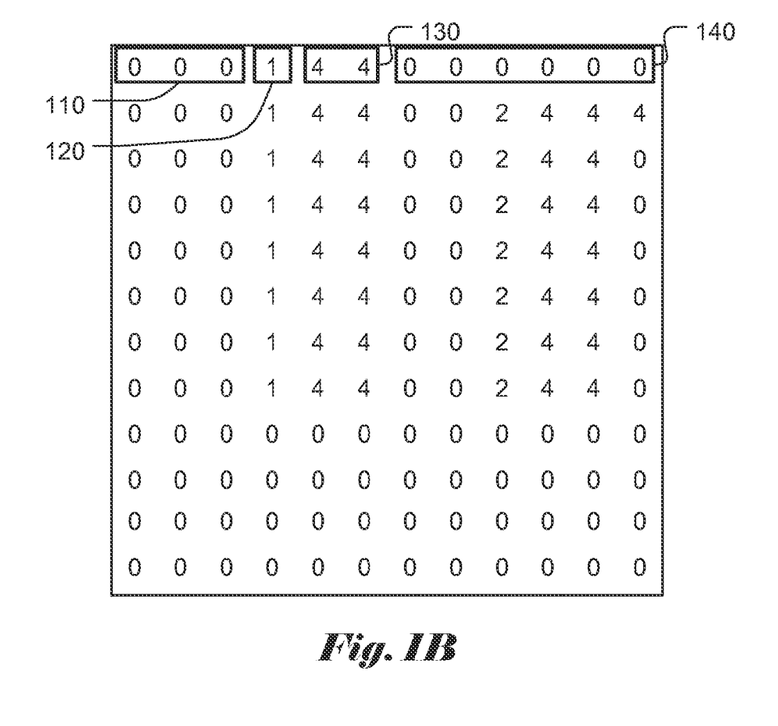
Figure 1C:
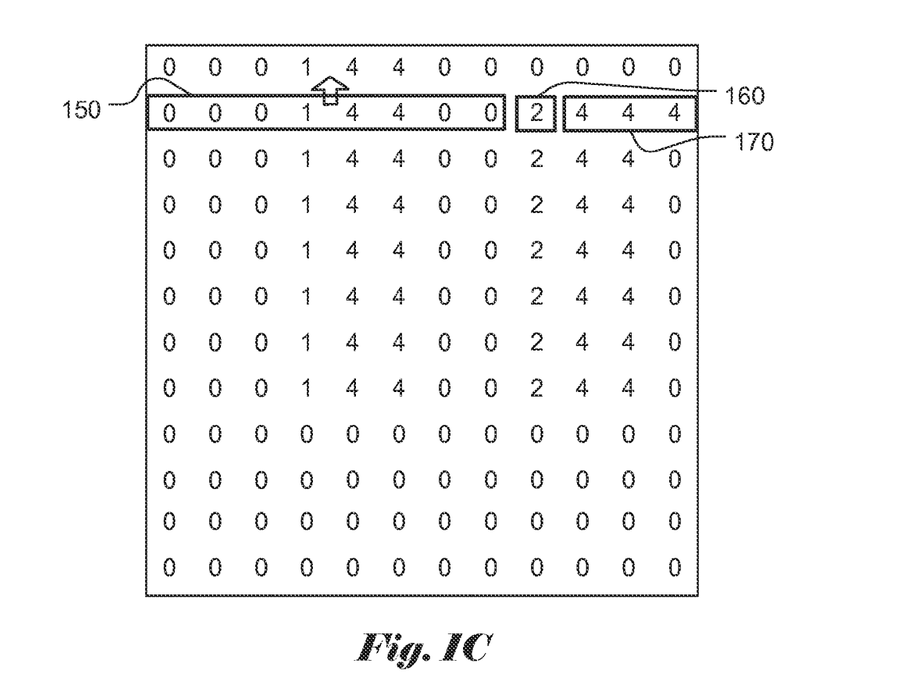

FIGS. 1A-C illustrate an exemplary of palette index map and palette index map coding according to screen content coding test model 2.0 (SCM-2.0). FIG. 1A illustrates a palette index map with palette indices 0 through 3 for palette colors and palette index 4 for Escape samples. The index corresponding to Escape samples is also referred as an Escape index in this disclosure. FIG. 1B illustrates palate index map coding according to SCM-2.0, where "copy-index mode" is applied to four groups (110, 120, 130 and 140) of the indices in the first row with "palette_runs" corresponding to 3, 1, 2, and 6. FIG. 1C illustrates an example of palette index map coding for the second row, wherein "copy-above mode" is applied to the first group of samples (150) and "copy-index mode" is applied to the next two groups (160 and 170) with runs corresponding to 8, 1 and 4.

Both the copy-index mode and copy-above mode are referred as "copy modes" in this disclosure. In the copy-index mode, the palette index of the leading pixel of the copy-index coded pixels is transmitted. The number of the copy-index coded pixels is also transmitted. At the decoder side, after determining the coding mode (i.e., copy-index mode) for the underlying pixels, only the information of the palette index of the leading pixel and the number of the copy-index coded pixels are needed to reconstruct the copy-index coded pixels. The pixels following the leading pixel can be reconstructed by "copying" from the predictor (i.e., the pixel on the left). The pixel value can be reconstructed using the palette table. In the copy-above mode, no palette index related to the predictors (i.e., the above pixels) needs to be transmitted since the above pixels have been reconstructed. The current pixels can be "copied" from the above pixels.

Palette Table Signaling

In the palette coding mode adopted in Screen context coding test model 2 (SCM-2.0, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R1014), a palette predictor table is used to store previously coded/decoded palette colors such that they can be utilized as predictor for the palettes of subsequent blocks. When the decoder decodes the bitstream, the palette colors of the first palette-coded block will be stored in the palette predictor table. The next palette-coded block can use colors from this stored table as a palette predictor. For these colors not predicted by the palette predictor, new colors in its palette will be signaled. To reconstruct the palette of the current block, the syntax for reconstructing the palette is disclosed in SCM-2.0 and one example is shown as following.

Step 1: Signaling or Parsing the Palette.

In this step, the palette is signaled at the encoder side and reconstructed at the decoder side by first checking whether the palette_sharing flag (i.e., palette_sharing_flag) is set. If the palette_sharing_flag is set (i.e., having a value of 1), the current palette is the same as the palette of the previous block. Otherwise, the palette is reconstructed according to a palette updating procedure. An example of syntax structure for reconstructing the palette is shown below.

Parse 'palette_sharing_flag'
If 'palette_sharing_flag' is equal to 1, current palette is the same as the previous block's palette
Otherwise,
Parse 'reuse_flags', to indicate which elements in the palette predictor table are reused in the current palette.
Parse 'num_signalled_palette', to indicate the number of new palette colors needs to be decoded for the current palette
Loop over 'num_signalled_palette', parse the palette color values Step 2. Signaling or Parsing the Color Index Map.

After the palette is signaled or reconstructed, the color index map is signaled at the encoder side or reconstructed at the decoder side using the reconstructed the palette and coded color indices as follows. The color index map is also referred as palette index map or index map in this disclosure.

Parse 'scan order' to indicate whether hor-traverse or ver-traverse
Parse 'block_level_escape_flag' to indicate whether there is ESCAPE samples 'new run mode' or 'copy above mode'
If 'copy index mode', parse 'index'
 If index=ESCAPE, parse ESCAPE sample value
 If index!=ESCAPE, parse 'run' to indicate the number samples with the same index
If 'copy above mode', parse 'run' to indicate the number samples with the same indices as the directly above samples It is desired to further improve the coding efficiency of color index map coding.

BRIEF SUMMARY OF THE INVENTION

Method and apparatus for coding a block of video data using palette coding in a video coding are disclosed. According to one embodiment of the present invention, whether there is only one single palette index in the current block is determined first. If there is only one single palette index in the current block, signaling a current palette index map for the current block is omitted at an encoder side or parsing any syntax for decoding the current palette index map for the current block is omitted at a decoder side. Whether there is only one single palette index in the current block is performed after signaling a current palette table for the current block at the encoder side or parsing the current palette table for the current block at the decoder side. When there is only one single palette index in the current block, syntax elements corresponding to palette run type, associated palette index and palette run are omitted at the encoder side.

Whether there is only one single palette index in the current block can be based on a the syntax element representing the number of predicted palette, the syntax element representing the number of signaled palette and the syntax element (e.g. CU_level_escape_flag) representing whether there is any Escape sample in the current block. If there is only one single palette index in the current block, the single palette index can be inferred to be zero at the decoder side. The current palette index map can be inferred to have one single color palette index and no Escape sample if the number of predicted palette is one, the number of signaled palette is zero and CU_level_escape_flag indicates no Escape sample. In this case, the single color palette index corresponds to the palette index predicted from a previous palette table. The current palette index map can be inferred to have one single color palette index and no Escape sample if the number of predicted palette is zero, the number of signaled palette is one and CU_level_escape_flag indicates no Escape sample. In this case, the single color palette index corresponds to the palette index signaled in a bitstream containing coded data for the current block. The current palette index map for the current block is decoded as all Escape samples if the number of predicted palette is zero, the number of signaled palette is zero and CU_level_escape_flag indicates at least one Escape sample.

In another embodiment, whether there is only one single palette index in the current block can be determined based on the syntax element corresponding to the maximum possible value for the palette index for the current block. If the maximum possible value for the palette index for the current block is zero, there is only one single palette index in the current block. If the maximum possible value for the palette index for the current block is zero, the syntax element corresponding to adjusted index map is not derived.

Another embodiment deals with a system incorporating a first syntax element to indicate whether there is only one single palette index in the block of video data and a second syntax element to indicate said one single palette index if the first syntax element is asserted. According to this embodiment, after signaling or parsing a current palette table for the current block, the corresponding total palette size of the current block including Escape index can be derived at an encoder side or at a decoder side. If the total palette size of the current block including Escape index is equal to one, signaling a current first syntax element and a current second syntax element is omitted at the encoder side or respective values for the current first syntax element and the current second syntax element are inferred at the decoder side. If the total palette size is greater than one, the current first syntax element is signaled at the encoder side or the current first syntax element is parsed at the decoder side. If the current first syntax element is equal to one, a current second syntax element is signaled at the encoder side or the current second syntax element is parsed at the decoder side. In this case, all samples of the current block are inferred to have one current index value equal to the current second syntax element. If the current first syntax element is equal to zero, a current index map for the current block is signaled at the encoder side or the current index map for the current block is parsed at the decoder side.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The syntax structure for color index map coding as disclosed in screen context coding test model 2 (SCM-2.0, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R1014) causes some inefficiency when all the samples in a block have the same color index. In such case, signaling of new run, copy above mode or the run length becomes unnecessary. Accordingly, the present invention discloses methods to identify and signal such blocks having a uniform index map.

Detection and Signaling when Only One Palette Element in a Block

In one embodiment, the condition of single palette index in a block (i.e., there is only one single palette index in the current block) is identified based on one or more signaled syntax elements implicitly without the need of signaling the palette index map. For example, the condition of one palette index can be determined based on the syntax defined in SCM-2.0 as follows:
  a) # of Predicted palette=1, # of signaled palette=0, CU_level_escape_flag=0 The above conditions correspond to the case that there is one palette color from the palette predictor (i.e., # of Predicted palette=1), no signaled palette (i.e., # of signaled palette=0) and no Escape sample (i.e., CU_level_escape_flag=0).
  b) # of Predicted palette=0, # of signaled palette=1, CU_level_escape_flag=0 The above conditions correspond to the case that there is no palette color from the palette predictor, one signaled palette and no Escape sample.
  c) # of Predicted palette=0, # of signaled palette=0, CU_level_escape_flag=1 The above conditions correspond to the case that there is no palette color from the palette predictor and no signaled palette, and all samples are Escape samples.

The number of predicted palette can be derived after decoding the syntax, such as palette_reuse_flags in SCM-2.0, which indicates whether the palette is reused. The number of predicted palette may also be determined based on other syntax elements in the bitstream. The present invention is not limited to the particular way that the number of predicted and/or signaled palette is signaled. The principle is to identify the condition of a single element in the palette based on other syntax elements. In all cases (i.e., cases a) through c) as shown above), there is only one possible index value (e.g. 0) for all the samples in the block. Thus, according the embodiments as shown above, whenever any of the above cases is asserted (i.e., the case being true), the syntax signaling for the index map is omitted and all indices are inferred as 0. The only one index may also be determined based on the index predicted from the previous palette for case a). The only one index may also be determined based on the index signaled in the bitstream for case b). In one embodiment, the determination of whether there is only one single palette index in the block is performed after signaling a palette table for the block at the encoder side or parsing the palette table for the block at the decoder side.

Note that, according to the palette syntax of SCM-2.0, embodiments of the present invention for cases a) and b) will omit the signaling of a new run of the size of the entire block, or consecutive copy above with run length equal to the block width. For case c), since SCM-2.0 palette does not allow runs of ESCAPE, the embodiments of the present invention will provide significant saving over the conventional approach that will consecutively signal ESCAPE index with a length of one. In the case wherein runs of ESCAPE is allowed (e.g. in SCM-3.0 and after), case c) will omit signaling a new run of the size of the entire block.

Incorporating Palette_Sharing_Flag with Single_Index_Flag

In this embodiment, the coding efficiency is improved for the case of a single palette index in a block by the signaling palette_sharing_flag with a new flag, single_index_flag. The new flag, single_index_flag is signaled in the cases when palette_sharing_flag is equal to 1, which indicates all samples in the block use the same index. Furthermore, the same index points to one of the elements in the previous palette (the shared palette). The combined syntax design for both palette_sharing_flag and single_index_flag can be summarized as follows.

If palette_sharing_flag=0, all indices in the block are inferred as 0 for the following cases:
  a) # of Predicted palette=1, # of signaled palette=0, CU_level_escape_flag=0 The above conditions correspond to the case that there is one palette color from the palette predictor (i.e., # of Predicted palette=1), no signaled palette and no Escape sample (i.e., CU_level_escape_flag=0).
  b) # of Predicted palette=0, # of signaled palette=1, CU_level_escape_flag=0 The above conditions correspond to the case that there is no predicted palette, one palette color transmitted as a new color (i.e., # of Predicted palette=0 and # of signaled palette=1) and no Escape sample.
  c) # of Predicted palette=0, # of signaled palette=0, CU_level_escape_flag=1 The above conditions correspond to the case that the current palate is empty (i.e., # of Predicted palette=0 and # of signaled palette=0) and all samples are Escape samples.

If palette_sharing_flag=1, index map coding according to embodiments of the present invention are shown as follows.
  d) If previous palette size=1 and CU_level_escape_flag=0, all indices in the block are inferred as 0.
    The above conditions correspond to the case that the current palate is the same as the previous palette and has only one index (i.e., previous palette size=1) and no Escape sample. All indices in the block are inferred as 0.
  e) If previous palette size=1 and CU_level_escape_flag=1, two approaches according to embodiments of the present invention can be used as follows.

i. Coding the index map using normal index map coding without signaling the new flag, single_index_flag.

ii. Signaling the new flag, single_index_flag first. If single_index_flag is 1, signaling the single_index. All sample indices are inferred as single_index. Otherwise (i.e., single_index_flag=0), coding the index map with normal index map coding.

f) If previous palette size>1, CU_level_escape_flag=0 or 1, two approaches according to embodiments of the present invention can be used as follows.

i. Coding the index map using normal index coding without signaling the new flag, single_index_flag.

ii. Signaling the new flag, single_index_flag first. If single_index_flag is 1, signaling the single_index. All sample indices are inferred as single_index. Otherwise (i.e., single_index_flag=0), coding the index map with normal index map coding.

Signaling or Inferring Single_Index_Flag

In this embodiment, the signaling of single_index_flag and single_index is after palette coding (e.g. after palette_sharing_flag, predicted palette, new transmitted palette, and CU_level_escape_flag signaling) and before index map coding.

If the total palette size (including the Escape index) is equal to 1, the single_index_flag is inferred as 1. The single_index is inferred as 0. All sample indices are inferred as single_index, which is 0.

Otherwise (i.e., the total palette size larger than 1), the new flag, single_index_flag is signaled. If single_index_flag is equal to 1, the single_index is signaled. All sample indices are inferred as single_index. Otherwise (i.e., single_index_flag=0), the index map is coded using normal index map coding.

Signaling of Zero/Single Color Palette

According to one embodiment of the present invention, the signaling of palette_run_type_flag (for indicating copy index mode or copy_above mode), the palette index palette_index_idc, and index run will all be omitted for a palette coded block if the current palette is empty (i.e., all samples are Escape coded) or if the current palette has only one color and no Escape (i.e., all samples with palette index 0). The palette index is derived as 0 and the index run is derived as the run over the entire CU (i.e., CU width×CU height−1). However, for these single index value cases, the signaling (at encoder) and parsing (at decoder) is omitted by using multiple conditional checks, where different conditions are checked for different syntax elements. Exemplary syntax table and semantics are shown as follows.

The checking process for the conditions to omit above mentioned syntax elements for each run of palette index is disclosed as follows.

a) First, whether to parse palette_run_type_flag is determined by checking the indexMax.

b) Then, whether to parse palette index palette_index_idc is determined using a derived variable adjustedIndexMax, for which the derivation requires its own conditional check, see the excerpted text below.

c) Finally, whether to parse palette run is determined again by indexMax.

Furthermore, for a general palette coded CU with more than one palette index values, the condition indexMax is unnecessarily checked twice for each run when looping over the multiple palette runs to parse the syntax.

Both the syntax table and the decoding process according to the existing design are not optimized for these parts related palette index map coding. Table 1 shows the syntax for palette_coding ( ) according to SCM-3.0 and SCC Draft Text 2. As shown in Table 1, the condition regarding whether indexmax is greater than zero is checked twice as noted in (1-1) and (1-2).

TABLE 1

```
palette_coding( x0, y0, nCbS) {                                           Note
   ...
   ...
      if(indexMax > 0 && scanPos > =nCbS && palette_run_type_flag[xcPrev][ycPrev  (1-1)
]
           ! = COPY_ABOVE_MODE ) {
           palette_run_type_flag[ xC ][ yC ]
         }
      if( palette_ run_type_flag[ xC ][ yC ] = = COPY_INDEX_MODE &&
         adjustedIndexMax > 0)
      if( indexMax > 0 ) {                                                  (1-2)
         maxPaletteRun = nCbS * nCbS − scanPos − 1
         if( maxPaletteRun > 0) {
           palette_run_msb_id_plus1
           if( palette_run_msb_id_plus1 > 1 )
           palette_run_refinement_bits
         }
      } else
      }
}
```

The variable indexMax specifies the maximum possible value for a palette index for the current coding unit. If palette_escape_val_present_flag is equal to 1, indexMax is set equal to the currentPaletteSize. If palette_escape_val_present_flag is equal to 0, indexMax is set equal to the (currentPaletteSize−1).

The variable adjustedIndexMax is derived according to indexMax adjustment process as follows:

```
adjustedIndexMax = indexMax
if( scanPos > 0 )
    adjustedIndexMax − = 1
```

In this invention, methods are disclosed to improve the syntax and decoding process for the palette index map.

Improved Syntax and Decoding Process for Palette Index

In one embodiment, signaling the palette run type, palette index and palette run is skipped simply based on only one conditional check. An exemplary syntax table incorporating an embodiment of the present invention is show in Table 2.

According to the syntax table in Table 2, the following is performed for each run of palette index:

a) Only one single conditional check on indexMax (i.e., Note (2-1)) is performed to determine whether to omit palette_run_type_flag, palette_index_idc, and palette run. The two checks on indexMax (i.e., Note (2-2) and (2-3)) in the conventional syntax design are deleted as indicated by double strikethrough.

b) If indexMax is not greater than 0, there is no need to derive adjustedIndexMax (as noted in (2-4)).

c) For a palette coded CU with more than one palette index value, the condition indexMax is checked only once when looping over the multiple palette runs to parse the syntax.

TABLE 2

| palette_coding( x0, y0, nCbS ) { | Note |
|---|---|
| ... | |
|   if( indexMax > 0 ) { | (2-1) |
|     if( scanPos > = nCbS && palette_run_type_flag | (2-2) |
|     [xcPrev][ycPrev] | |
|       ! = COPY_ABOVE_MODE ) { | |
|       palette_run_type_flag[ xC ][ yC ] | |
|     } | |
|     if( palette_run_type_flag[ xC ][ yC ] = = | (2-4) |
|     COPY_INDEX_MODE && | |
|       adjustedIndexMax > 0) | |
|       palette_index_idc | |
| | (2-3) |
|     maxPaletteRun = nCbS * nCbS − scanPos − 1 | |
|     if( maxPaletteRun > 0) { | |
|       palette_run_msb_id_plus1 | |
|       if( palette_run_msb_id_plus1 > 1 ) | |
|         palette_run_refinement_bits | |
|   }else | |
|     } | |
|   } | |
| } | |

In another embodiment, the conditional check is moved outside the while-loop over index positions (i.e., while (scanPos<nCbS*nCbS)). Since when the palette size is empty or one, there can be only one run with all indices being zero; the entire condition can be established outside the while-loop. In this embodiment, for a palette CU with more than one palette index value, there is no need to check the condition indexMax at all when looping over the multiple palette runs to parse the syntax. As for the cases with only possible index value (indexMax=0), the parsing/decoding will skip the while-loop, and the only syntax elements to be decoded are the Escape values when palette_escape_val_present_flag is equal to 1.

TABLE 3

| palette_ coding( x0, y0, nCbS ) { | Note |
|---|---|
| ... | |
|   if( indexMax > 0 ) { | |
|     palette_transpose_flag | |
|     scanPos = 0 | |
|     while( scanPos < nCbS * nCbS ) { | |
|       ... | |
|       if( && scanPos > = nCbS && palette_run_type_flag | |
|       [xcPrev][ycPrev] | |
|         ! = COPY_ABOVE_MODE ) { | |
|         palette_run_type_flag[ xC ][ yC ] | |
|       } | |
|       if( palette_run_type_flag[ xC ][ yC ] = = | |
|       COPY_INDEX_MODE && | |
|         adjustedIndexMax > 0) | |
|         palette_index_idc | |
|         maxPaletteRun = nCbS * nCbS − scanPos − 1 | |
|         if( maxPaletteRun > 0) { | |

TABLE 3-continued

|           palette_run_msb_id_plus1 | |
|---|---|
|           if( palette_run_msb_id_plus1 > 1 ) | |
|             palette_run_refinement_bits | |
|       ... | |
|     } | |
|   } | |
| } | |

Figure 2:
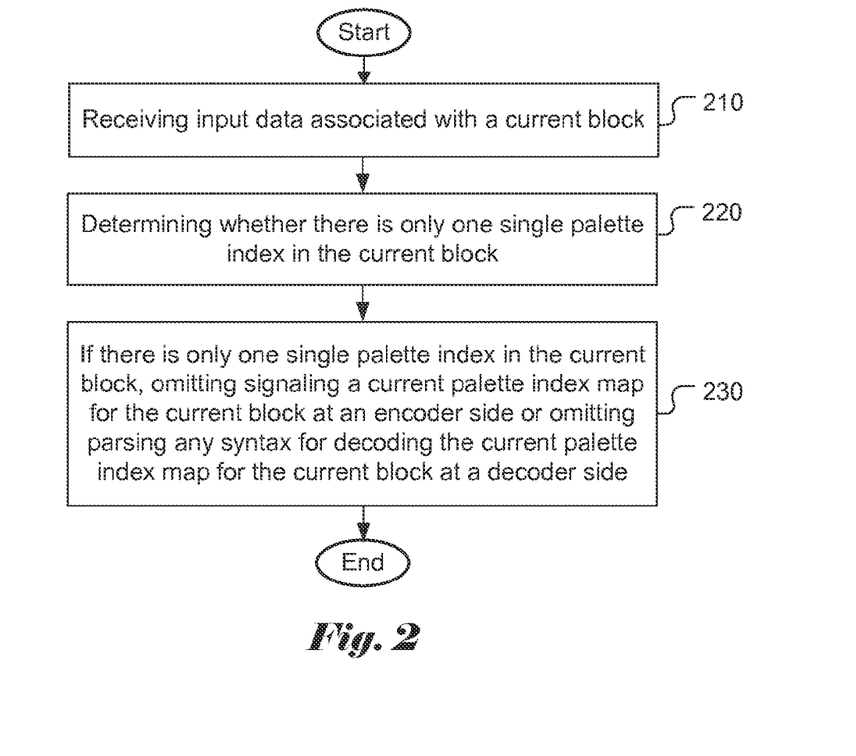
FIG. 2 illustrates an exemplary flowchart for palette index map coding according to an embodiment of the present invention, where signaling a current palette index map for the current block is omitted at an encoder side or parsing any syntax for decoding the current palette index map for the current block is omitted at a decoder side.

FIG. 2 illustrates an exemplary flowchart for palette index map coding according to an embodiment of the present invention, where signaling a current palette index map for the current block is omitted at an encoder side or parsing any syntax for decoding the current palette index map for the current block is omitted at a decoder side. The system receives input data associated with a current block as shown in step 210. For encoding, the input data associated with the current block corresponds to current palette and Escape flag of the block to be coded. For decoding, the input data associated with the current block corresponds to the current palette and Escape flag. The input data associated with the current block may be retrieved from memory (e.g., computer memory, buffer (RAM or DRAM) or other media) or from a processor. Whether there is only one single palette index in the current block is determined in step 220. If there is only one single palette index in the current block, signaling a current palette index map for the current block is omitted at an encoder side or parsing any syntax for decoding the current palette index map for the current block is omitted at a decoder side in step 230.

Figure 3:
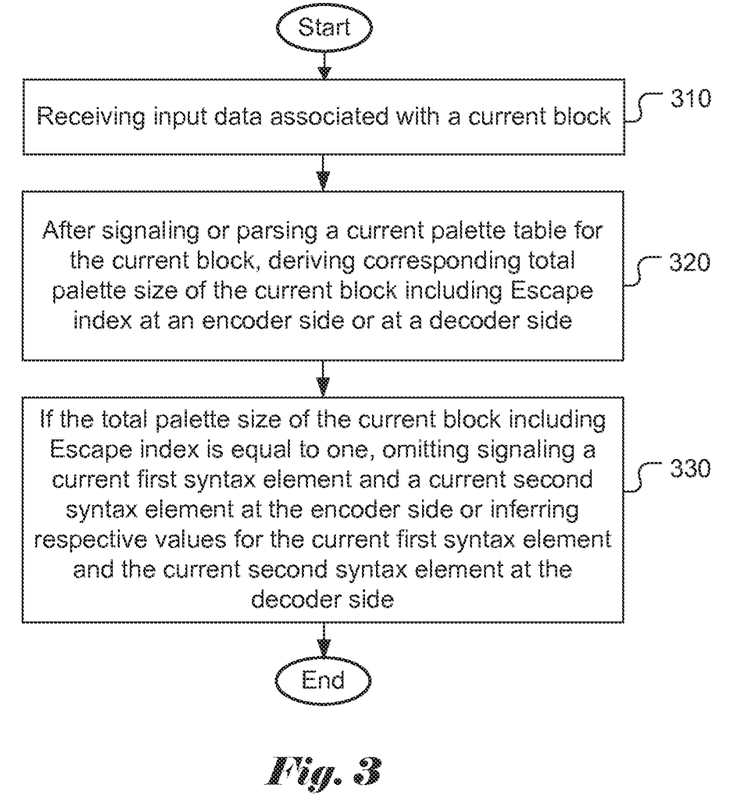
FIG. 3 illustrates an exemplary flowchart for palette index map coding according to an embodiment of the present invention, where a syntax element corresponding to a total palette size of the current block is signaled at an encoder side or parsed at a decoder side and if the total palette size is equal to one, a first syntax element to indicate whether there is only one single palette index in the block of video data and a second syntax element to indicate said one single palette index if the first syntax element is asserted are omitted.

FIG. 3 illustrates an exemplary flowchart for palette index map coding according to an embodiment of the present invention, where one or more syntax elements corresponding to a total palette size of the current block are signaled at an encoder side or parsed at a decoder side and if the total palette size is equal to one, a first syntax element to indicate whether there is only one single palette index in the block of video data and a second syntax element to indicate said one single palette index if the first syntax element is asserted are omitted. The system receives input data associated with a current block as shown in step 310. After signaling or parsing a current palette table for the current block, the corresponding total palette size of the current block including Escape index is derived at an encoder side or at a decoder side in step 320. If the total palette size of the current block including Escape index is equal to one, signaling a current first syntax element and a current second syntax element is omitted at the encoder side or respective values for the current first syntax element and the current second syntax element are inferred at the decoder side in step 330.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a block of video data using palette coding in a video coding system, the method comprising:
   receiving input data associated with a current block;
   determining whether there is only one single palette index in the current block based on one or a combination of a first syntax element corresponding to a first number of predicted palette, a second syntax element corresponding to a second number of signaled palette, a third syntax element corresponding to CU_level_escape_flag indicating whether there is any Escape sample in the current block and a forth syntax element corresponding to a maximum possible value for the palette index for the current block; and
   if there is only one single palette index in the current block, omitting signaling a current palette index map for the current block at an encoder side or omitting parsing any syntax for decoding the current palette index map for the current block at a decoder side.

2. The method of claim 1, wherein said determining whether there is only one single palette index in the current block is performed after signaling a current palette table for the current block at the encoder side or parsing the current palette table for the current block at the decoder side.

3. The method of claim 1, wherein if there is only one single palette index in the current block, said one single palette index is inferred to be zero at the decoder side.

4. The method of claim 1, wherein the current palette index map is inferred to have one single color palette index and no Escape sample if the first number of predicted palette is one, the second number of signaled palette is zero and CU_level_escape_flag indicates no Escape sample.

5. The method of claim 4, wherein said one single color palette index corresponds to one palette element predicted from a previous palette table.

6. The method of claim 1, wherein the current palette index map is inferred to have one single color palette index and no Escape sample if the first number of predicted palette is zero, the second number of signaled palette is one and CU_level_escape_flag indicates no Escape sample.

7. The method of claim 6, wherein said one single color palette index corresponds to one palette element signaled in a bitstream containing coded data for the current block.

8. The method of claim 1, wherein the current palette index map for the current block is decoded as all Escape samples if the first number of predicted palette is zero, the second number of signaled palette is zero and CU_level_escape_flag indicates at least one Escape sample.

9. The method of claim 1, wherein if the maximum possible value for the palette index of the current block is zero, there is only one single palette index in the current block.

10. The method of claim 9, wherein if the maximum possible value for the palette index of the current block is zero, a fifth syntax element corresponding to adjusted index map is not derived.

11. The method of claim 1, wherein when there is only one single palette index in the current block, syntax elements corresponding to palette run type, associated palette index and palette run are omitted at the encoder side.

12. An apparatus for coding a block of video data using palette coding, the apparatus comprising one or more electronic circuits configured to:
   receive input data associated with a current block;
   determine whether there is only one single palette index in the current block based on one or a combination of a first syntax element corresponding to a first number of predicted palette, a second syntax element corresponding to a second number of signaled palette, a third syntax element corresponding to CU_level_escape_flag indicating whether there is any Escape sample in the current block and a forth syntax element corresponding to a maximum possible value for the palette index for the current block; and
   if there is only one single palette index in the current block, omit signaling a current palette index map for the current block at an encoder side or omit parsing any syntax for decoding the current palette index map for the current block at a decoder side.

13. A method for coding a block of video data using palette coding in a video coding system, wherein the video coding system incorporates a first syntax element to indicate whether there is only one single palette index in the block of video data based on one or a combination of a syntax element corresponding to a first number of predicted palette, a syntax element corresponding to a second number of signaled palette, a syntax element corresponding to CU_level_escape_flag indicating whether there is any Escape sample in the current block and a syntax element corresponding to a maximum possible value for the palette index for the current block, and a second syntax element to indicate said one single palette index if the first syntax element is asserted, the method comprising:
   receiving input data associated with a current block;
   after signaling or parsing a current palette table for the current block, deriving corresponding total palette size of the current block including Escape index at an encoder side or at a decoder side; and
   if the total palette size of the current block including the Escape index is equal to one, omitting signaling a current first syntax element and a current second syntax element at the encoder side or inferring respective values for the current first syntax element and the current second syntax element at the decoder side.

14. The method of claim 13, further comprising if the total palette size is greater than one, signaling the current first syntax element at the encoder side or parsing the current first syntax element at the decoder side.

15. The method of claim 13, further comprising if the current first syntax element is equal to one, signaling the current second syntax element at the encoder side or parsing the current second syntax element at the decoder side.

16. The method of claim 15, wherein all samples of the current block are inferred to have one current index value equal to the current second syntax element.

17. The method of claim 13, further comprising if the current first syntax element is equal to zero, signaling a current index map for the current block at the encoder side or parsing the current index map for the current block at the decoder side.

* * * * *